(12) United States Patent
Asai et al.

(10) Patent No.: US 11,954,777 B2
(45) Date of Patent: Apr. 9, 2024

(54) IMAGE PROCESSING APPARATUS, IMAGE PROCESSING METHOD, AND PROGRAM

(71) Applicant: SONY GROUP CORPORATION, Tokyo (JP)

(72) Inventors: Satoshi Asai, Saitama (JP); Yo Nonoyama, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 71 days.

(21) Appl. No.: 17/766,078

(22) PCT Filed: Sep. 28, 2020

(86) PCT No.: PCT/JP2020/036519
§ 371 (c)(1),
(2) Date: Apr. 1, 2022

(87) PCT Pub. No.: WO2021/070650
PCT Pub. Date: Apr. 15, 2021

(65) Prior Publication Data
US 2022/0343575 A1    Oct. 27, 2022

(30) Foreign Application Priority Data
Oct. 10, 2019  (JP) .................................. 2019-186746

(51) Int. Cl.
*G06T 13/20*     (2011.01)
*G06T 15/20*     (2011.01)
*G06T 19/20*     (2011.01)

(52) U.S. Cl.
CPC .............. *G06T 13/20* (2013.01); *G06T 15/20* (2013.01); *G06T 19/20* (2013.01); *G06T 2200/04* (2013.01); *G06T 2219/2016* (2013.01)

(58) Field of Classification Search
CPC ......... G06T 13/20; G06T 15/20; G06T 19/20; G06T 2200/04; G06T 2219/2016
See application file for complete search history.

(56) References Cited

U.S. PATENT DOCUMENTS

2019/0269881 A1\*   9/2019  Iida ........................ A61M 21/02

FOREIGN PATENT DOCUMENTS

EP        3367666 A1 \*  8/2018  ......... G06F 3/04815
JP     2009-244936 A     10/2009
(Continued)

*Primary Examiner* — Xin Sheng
(74) *Attorney, Agent, or Firm* — Paratus Law Group, PLLC

(57) ABSTRACT

There is provided an image processing apparatus, an image processing method, and a program capable of expanding the range of expression in a moving image generated by use of a 3D model. The image processing apparatus includes: a virtual camera setting unit that makes settings for a virtual camera; a virtual viewpoint image generation unit that generates a virtual viewpoint image that is an image of a 3D object viewed from a viewpoint of the virtual camera; a composition unit that generates a composite image based on a plurality of the virtual viewpoint images; and a moving image generation unit that generates a moving image including a frame based on the virtual viewpoint image or the composite image, in which after arranging a plurality of the virtual cameras, the virtual camera setting unit moves at least one of the plurality of virtual cameras to integrate the plurality of virtual cameras. The present technology can be applied to, for example, an apparatus that edits a moving image.

15 Claims, 11 Drawing Sheets

(56) References Cited

FOREIGN PATENT DOCUMENTS

| JP | 2009244936 A | * | 10/2009 |
| JP | 2013-220137 A | | 10/2013 |
| JP | 2013220137 A | * | 10/2013 |
| JP | 2015187797 A | * | 10/2015 |
| WO | WO 2018/150933 A1 | | 8/2018 |

* cited by examiner

IMAGE PROCESSING APPARATUS, IMAGE PROCESSING METHOD, AND PROGRAM

CROSS REFERENCE TO PRIOR APPLICATION

This application is a National Stage Patent Application of PCT International Patent Application No. PCT/JP2020/036519 (filed on Sep. 28, 2020) under 35 U.S.C. § 371, which claims priority to Japanese Patent Application No. 2019-186746 (filed on Oct. 10, 2019), which are all hereby incorporated by reference in their entirety.

TECHNICAL FIELD

The present technology relates to an image processing apparatus, an image processing method, and a program, and more particularly, to an image processing apparatus, an image processing method, and a program suitable for use in the case of generating a moving image by use of a 3D model.

BACKGROUND ART

In recent years, a technique is becoming widespread in which a 3D model of an object (subject) is generated on the basis of images captured by a plurality of cameras arranged in such a way as to surround the object and an image of the object viewed from a desired viewpoint is reproduced by use of the generated 3D model (see, for example, Patent Document 1).

CITATION LIST

Patent Document 1: WO 2018/150933 A

SUMMARY OF THE INVENTION

Problems to be Solved by the Invention

An image of an object based on a desired viewpoint can be reproduced by use of the above-described technique. Therefore, it is expected that the above-described technique will expand the range of expression in a moving image.

The present technology has been made in view of such circumstances, and is intended to enable expansion of the range of expression in a moving image generated by use of a 3D model.

Solutions to Problems

An image processing apparatus according to one aspect of the present technology includes: a virtual camera setting unit that makes settings for a virtual camera; a virtual viewpoint image generation unit that generates a virtual viewpoint image that is an image of a 3D object viewed from a viewpoint of the virtual camera; a composition unit that generates a composite image based on a plurality of the virtual viewpoint images; and a moving image generation unit that generates a moving image including a frame based on the virtual viewpoint image or the composite image, in which after arranging a plurality of the virtual cameras, the virtual camera setting unit moves at least one of the plurality of virtual cameras to integrate the plurality of virtual cameras.

An image processing method according to one aspect of the present technology includes: causing an image processing apparatus to move at least one of a plurality of virtual cameras to integrate the plurality of virtual cameras after arranging the plurality of virtual cameras, the image processing apparatus being configured to make settings for the virtual camera; generate a virtual viewpoint image that is an image of a 3D object viewed from a viewpoint of the virtual camera; generate a composite image based on a plurality of the virtual viewpoint images; and generate a moving image including a frame based on the virtual viewpoint image or the composite image.

A program according to one aspect of the present technology causes a computer of an image processing apparatus to perform a process of moving at least one of a plurality of virtual cameras to integrate the plurality of virtual cameras after arranging the plurality of virtual cameras, the image processing apparatus being configured to make settings for the virtual camera; generate a virtual viewpoint image that is an image of a 3D object viewed from a viewpoint of the virtual camera; generate a composite image based on a plurality of the virtual viewpoint images; and generate a moving image including a frame based on the virtual viewpoint image or the composite image.

In one aspect of the present technology, after a plurality of virtual cameras is arranged, at least one of the plurality of virtual cameras is moved to integrate the plurality of virtual cameras.

MODE FOR CARRYING OUT THE INVENTION

Modes for carrying out the present technology will be described below. Description will be provided in the following order.

1. Embodiment
2. Modifications
3. Others

1. Embodiment

An embodiment of the present technology will be described with reference to FIGS. 1 to 10.

Configuration Example of Image Processing Apparatus

Figure 1:
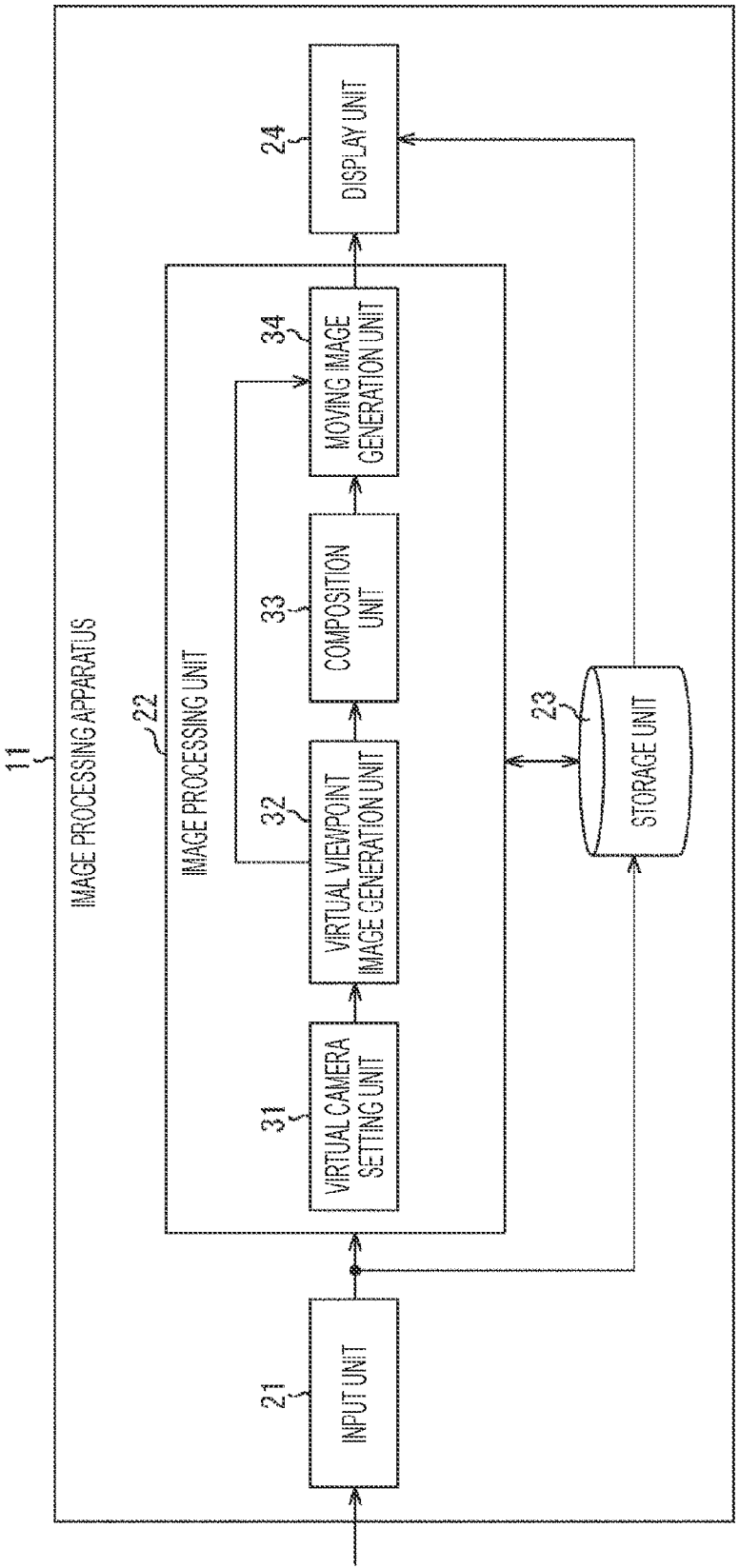
FIG. 1 is a block diagram showing a configuration example of an image processing apparatus to which the present technology has been applied.

FIG. 1 is a block diagram showing an embodiment of an image processing apparatus 11 to which the present technology has been applied.

The image processing apparatus 11 is an apparatus that generates a moving image by using a 3D model.

Note that the type of 3D model and a method for generating a 3D model are not particularly limited. For example, the 3D model to be used may be a 3D model generated on the basis of images captured from a plurality of viewpoints around a real object (subject), or may be a 3D model artificially generated by use of computer graphics or the like. Furthermore, in the former case, the 3D model may be, for example, a model in which texture information has been superimposed on a polygon, or a model in which texture information has been superimposed on a point cloud.

In addition, the number of objects (hereinafter, referred to as 3D objects) in the 3D model is not particularly limited. That is, only a single 3D object (for example, a single person) may be present in the 3D model, or a plurality of 3D objects (for example, a plurality of persons) may be present in the 3D model.

The image processing apparatus 11 includes an input unit 21, an image processing unit 22, a storage unit 23, and a display unit 24.

The input unit 21 includes, for example, various input devices, and is used for inputting data (for example, 3D model data) necessary for processing to be performed by the image processing apparatus 11, instructions (for example, virtual camera setting instructions), and the like. The input unit 21 supplies the input data, instructions, and the like to the image processing unit 22, and stores the input data, instructions, and the like in the storage unit 23.

A virtual camera setting unit 31 makes settings for a virtual camera to be used for generation of a virtual viewpoint image on the basis of a setting instruction and the like input by a user via the input unit 21. For example, the virtual camera setting unit 31 sets the position, orientation, focal length (angle of view), and the like of the virtual camera in a 3D space where the 3D model exists. The virtual camera setting unit. 31 supplies the setting information on the virtual camera to a virtual viewpoint image generation unit 32.

The virtual viewpoint image generation unit 32 generates a virtual viewpoint image on the basis of the 3D model data input via the input unit 21 or stored in the storage unit 23 and the virtual camera set by the virtual camera setting unit 31.

The virtual viewpoint image is, for example, a virtual image of a 3D object in the 3D model, viewed from a viewpoint (hereinafter, referred to as a virtual viewpoint) of the virtual camera. More specifically, the virtual viewpoint image is a virtual image assumed to be obtained in a case where an image of a 3D object in the 3D model is captured by the virtual camera with the set position, orientation, and focal length.

The virtual viewpoint image generation unit 32 supplies the generated virtual viewpoint image to a composition unit 33 and a moving image generation unit 34, or stores the generated virtual viewpoint image in the storage unit 23, as necessary.

The composition unit 33 generates a composite image on the basis of virtual viewpoint images generated on the basis of a plurality of different virtual cameras. The composition unit 33 supplies the generated composite image to the moving image generation unit 34, or stores the generated composite image in the storage unit 23, as necessary.

The moving image generation unit 34 generates a frame based on the virtual viewpoint image or the composite image, and generates a moving image including the generated frame. The moving image generation unit 34 stores the generated moving image in the storage unit 23, or supplies the generated moving image to the display unit 24, as necessary.

The display unit 24 includes, for example, a display including a liquid crystal display (LCD) or an organic EL display. The display unit 24 displays the moving image supplied from the moving image generation unit 34, the moving image stored in the storage unit 23, the virtual viewpoint image, the composite image, and the like.

Moving Image Generation Process

Figure 2:
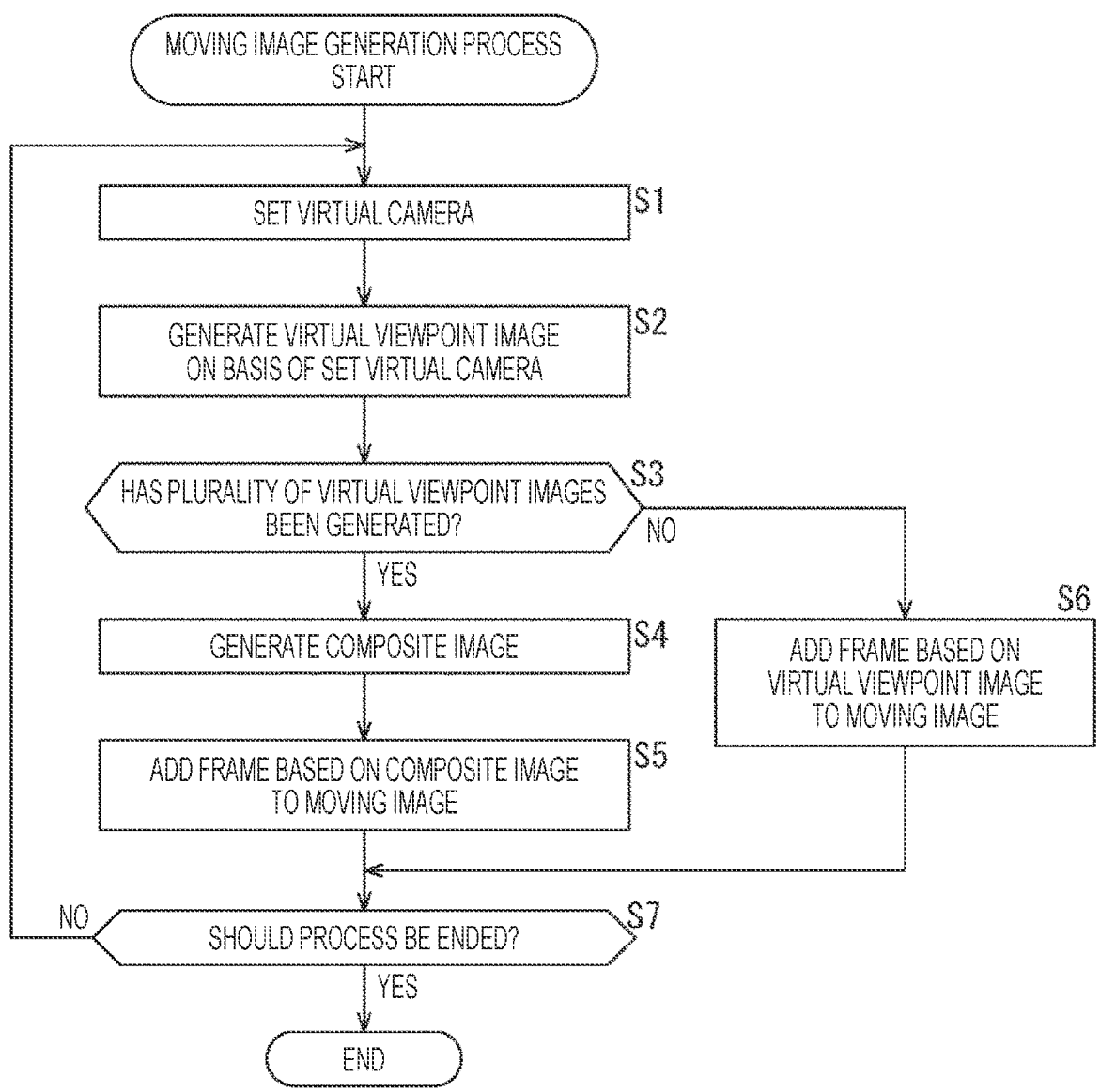
FIG. 2 is a flowchart for describing a moving image generation process.

Next, a moving image generation process to be performed by the image processing apparatus 11 will be described with reference to a flowchart of FIG. 2.

This process is started when, for example, the user inputs an instruction to generate a moving image via the input unit 21.

In step S1, the virtual camera setting unit 31 makes settings for a virtual camera. For example, the virtual camera setting unit 31 sets the position, orientation, focal length, and the like of the virtual camera in the 3D space on the basis of a setting instruction input by the user via the input unit 21. Alternatively, for example, the virtual camera setting unit 31 sets the position, orientation, focal length, and the like of the virtual camera in the 3D space according to a preset algorithm, rule, and the like.

At this time, a plurality of virtual cameras may be arranged for, for example, a single 3D object. Furthermore, in a case where the process is to be performed for, for example, a plurality of 3D objects, a virtual camera may be placed individually for each 3D object, or a common virtual camera may be placed for the plurality of 3D objects.

The virtual camera setting unit 31 generates setting information on the virtual camera, and supplies the setting information to the virtual viewpoint image generation unit 32. The setting information on the virtual camera includes, for example, parameters such as the position, orientation, and focal length of each virtual camera in the 3D space, and information regarding a 3D object to be imaged by each virtual camera.

In step S2, the virtual viewpoint image generation unit 32 generates a virtual viewpoint image on the basis of the set virtual camera.

Specifically, the virtual viewpoint image generation unit 32 acquires data on a 3D model including a 3D object for which a virtual viewpoint image is to be generated. For example, the 3D model data may be input from the outside via the input unit 21, or may be stored in the storage unit 23 in advance.

Then, the virtual viewpoint image generation unit 32 generates a virtual viewpoint image for each combination of the virtual camera and the 3D object. That is, the virtual viewpoint image generation unit 32 generates, for each virtual camera, a virtual viewpoint image of a target 3D object viewed from the viewpoint (virtual viewpoint) of each virtual camera.

In step S3, the virtual viewpoint image generation unit 32 determines whether or not a plurality of virtual viewpoint images has been generated. In a case where it is determined that a plurality of virtual viewpoint images has been generated, the process proceeds to step S4.

In step S4, the composition unit 33 generates a composite image.

Specifically, the virtual viewpoint image generation unit 32 supplies, to the composition unit 33, the plurality of virtual viewpoint images generated in the processing in step S2.

The composition unit 33 generates a composite image on the basis of the plurality of acquired virtual viewpoint images. The composition unit 33 supplies the generated composite image to the moving image generation unit 34.

Note that a method for generating the composite image is not particularly limited. For example, the composition unit 33 generates a composite image by arranging a plurality of virtual viewpoint images. For example, the composition unit 33 generates a composite image by superimposing a plurality of virtual viewpoint images one on top of another. For example, the composition unit 33 generates a composite image by cutting out a region including a 3D object from each virtual viewpoint image and arranging the regions in a single image.

In step S5, the moving image generation unit 34 adds a frame based on the composite image to a moving image. Specifically, the moving image generation unit 34 generates a frame to be included in the moving image on the basis of the acquired composite image. At this time, for example, the moving image generation unit 34 may combine an image of a background or the like with the composite image as necessary. The moving image generation unit 34 adds the generated frame as a latest frame to the moving image being generated.

Thereafter, the process proceeds to step S7.

Meanwhile, in a case where it is determined in step S3 that a single virtual viewpoint image has been generated, the process proceeds to step S6.

In step S6, the moving image generation unit 34 adds a frame based on the virtual viewpoint image to the moving image.

Specifically, the virtual viewpoint image generation unit 32 supplies the virtual viewpoint image generated in the processing in step S2 to the moving image generation unit 34.

The moving image generation unit 34 generates a frame to be included in the moving image on the basis of the acquired virtual viewpoint image. At this time, for example, the moving image generation unit 34 may combine an image of a background or the like with the virtual viewpoint image as necessary. The moving image generation unit 34 adds the generated frame as a latest frame to the moving image being generated.

Thereafter, the process proceeds to step S7.

In step S7, the moving image generation unit 34 determines whether or not to end the process. In a case where it is determined that the process should not be ended, the process returns to step S1.

Thereafter, in step S7, the processing in steps S1 to S7 is repeatedly performed until it is determined that the process should be ended. As a result, the process is repeated in which a virtual viewpoint image is generated on the basis of the virtual camera, a composite image is generated as necessary, and a frame based on the virtual viewpoint image or the composite image is added to the moving image.

Meanwhile, in step S7, in a case where, for example, an instruction to stop generation of the moving image is input by the user via the input unit 21, the moving image generation unit 34 determines that the process should be ended.

Thereafter, the moving image generation process ends.

As described above, the moving image is generated by use of the 3D model.

Specific Example of Moving Image Generation Method

Next, specific examples of a moving image generation method will be described with reference to FIGS. 3 to 10.

First, a first specific example of the moving image generation method will be described with reference to FIGS. 3 to 8.

Figure 3:
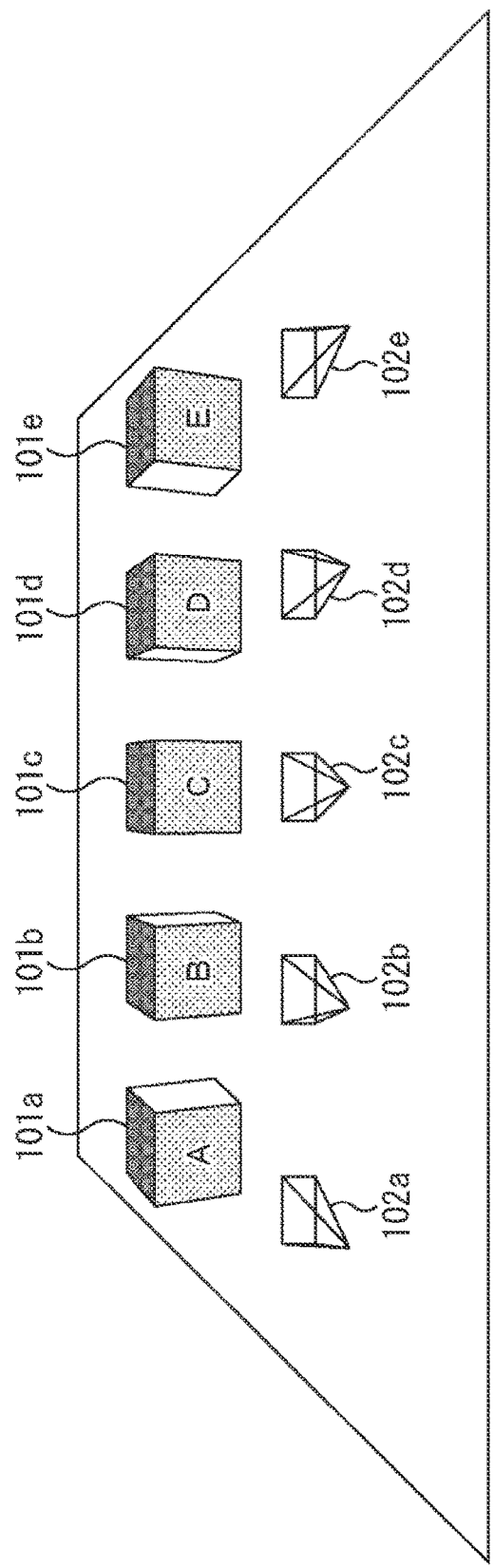
FIG. 3 is a diagram for describing a first specific example of a moving image generation method.

In an example of FIG. 3, 3D objects 101a to 101e are arranged in a lateral direction in the 3D space.

Hereinafter, in a case where it is not necessary to individually distinguish the 3D objects 101a to 101e, these objects are simply referred to as 3D objects 101. Furthermore, hereinafter, a surface of each 3D object 101 with an alphabetical letter written thereon is defined as a front surface of each 3D object 101.

Note that the 3D objects 101 may be included in different 3D models, or may be included in the same 3D model.

In the former case, for example, an image of each object is individually captured, and a plurality of 3D models is generated such that the 3D object 101 corresponding to each object is included in corresponding one of the plurality of 3D models. Then, the 3D models including the respective 3D objects 101 are separately arranged in the 3D space. Therefore, in this case, positions of the 3D objects 101 relative to each other can be changed in the 3D space.

In the latter case, for example, images of objects are captured at the same time, and a single 3D model is generated such that all the 3D objects 101 corresponding to the objects are included in the single 3D model. Then, the 3D model including all the 3D objects 101 is placed in the 3D space. Therefore, in this case, the positions of the 3D objects 101 relative to each other are fixed in the 3D space.

Then, the virtual camera setting unit 31 separately arranges virtual cameras 102a to 102e for the 3D objects 101a to 101e, respectively.

Hereinafter, in a case where it is not necessary to individually distinguish the virtual cameras 102a to 102e, these virtual cameras are simply referred to as virtual cameras 102.

Each virtual camera 102 is placed at a predetermined distance from the front surface of the corresponding 3D object 101 in such a way as to face the front surface of the corresponding 3D object 101.

Next, the virtual viewpoint image generation unit 32 generates a virtual viewpoint image including the corresponding 3D object 101 on the basis of each virtual camera 102.

Figure 4:
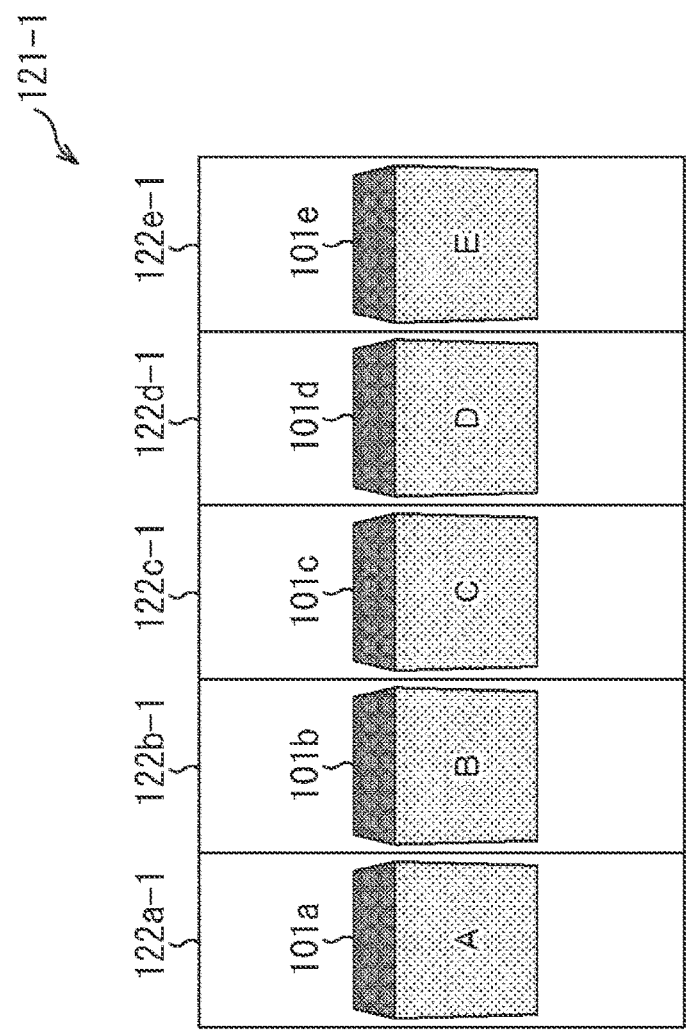
FIG. 4 is a diagram for describing the first specific example of the moving image generation method.

Next, as shown in FIG. 4, the composition unit 33 generates a composite image by combining respective images of rectangular regions cut out from the virtual viewpoint images. The rectangular regions are equal in size, and each include the corresponding 3D object 101. Specifically, the composition unit 33 generates a composite image 121-1 in which images 122a-1 to 122e-1 are arranged side by side.

Note that the image 122a-1 is an image of a rectangular region including the 3D object 101a, cut out from a virtual viewpoint image generated on the basis of the virtual camera 102a. The image 122b-1 is an image of a rectangular region including the 3D object 101b, cut out from a virtual viewpoint image generated on the basis of the virtual camera 102b. The image 122c-1 is an image of a rectangular region including the 3D object 101c, cut out from a virtual viewpoint image generated on the basis of the virtual camera 102*c*. The image 122*d*-1 is an image of a rectangular region including the 3D object 101*d*, cut out from a virtual viewpoint image generated on the basis of the virtual camera 102*d*. The image 122*e*-1 is an image of a rectangular region including the 3D object 101*e*, cut out from a virtual viewpoint image generated on the basis of the virtual camera 102*e*.

Then, the moving image generation unit 34 generates a frame based on the composite image 121-1, and adds the frame to a moving image.

Figure 5:
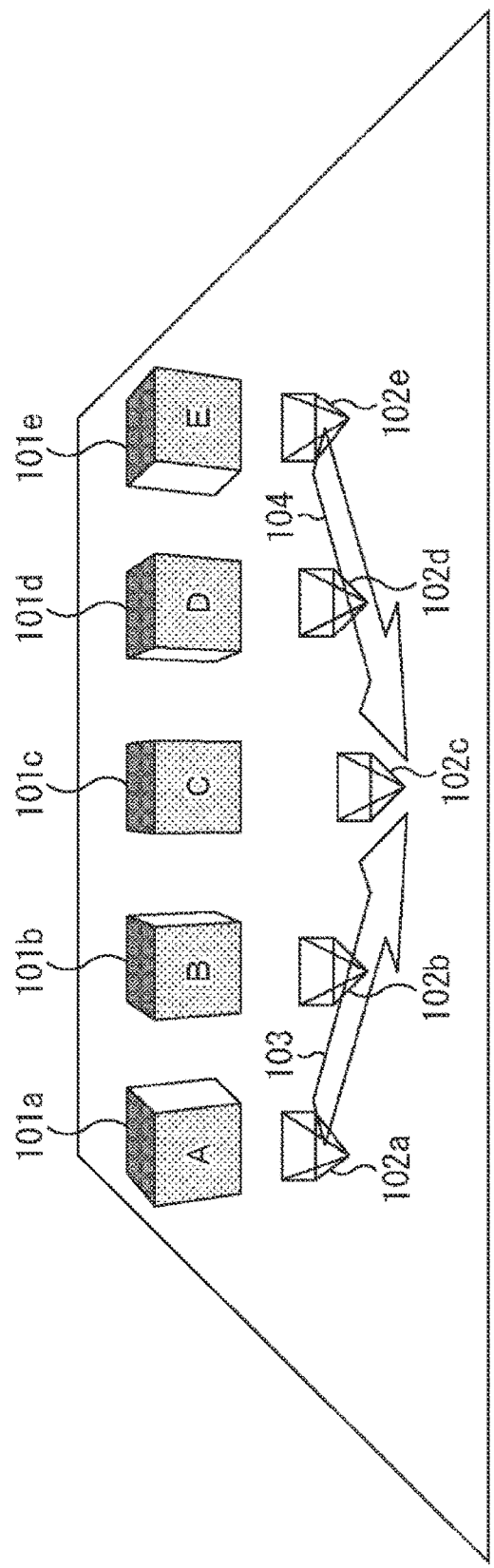
FIG. 5 is a diagram for describing the first specific example of the moving image generation method.

Next, as shown in FIG. 5, the virtual camera setting unit 31 moves the virtual cameras 102 in respective directions in such a way as to integrate the virtual cameras 102 into a single virtual camera.

Specifically the virtual camera 102*c* moves backward (In a direction away from the 3D object 101*c*) while kept facing the front surface of the 3D object 101*c*. As indicated by an arrow 103 in the drawing, the virtual camera 102*a* and the virtual camera 102*b* move in a direction in which the virtual camera 102*a* and the virtual camera 102*b* approach the virtual camera 102*c* (diagonally backward right direction) without changing their respective orientations. As indicated by an arrow 104 in the drawing, the virtual camera 102*d* and the virtual camera 102*e* move in a direction in which the virtual camera 102*d* and the virtual camera 102*e* approach the virtual camera 102*c* (diagonally backward left direction) without changing their respective orientations.

Next, before the virtual cameras 102 are integrated, the virtual viewpoint image generation unit 32 generates a plurality of virtual viewpoint images including the corresponding 3D objects 101 on the basis of the respective virtual cameras 102.

Figure 6:
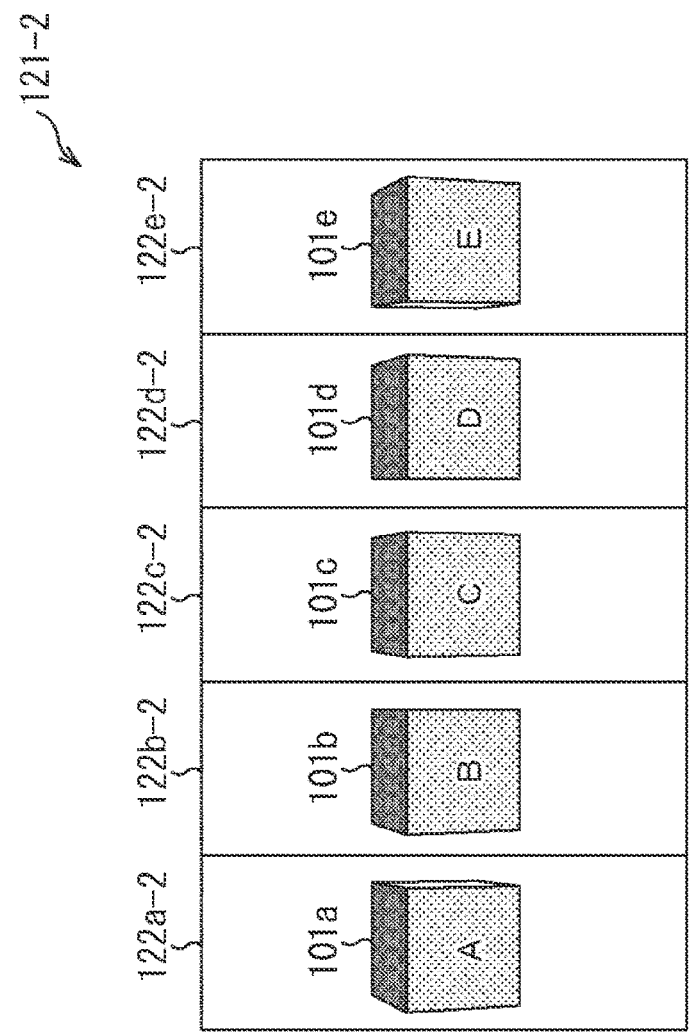
FIG. 6 is a diagram for describing the first specific example of the moving image generation method.

Next, as shown in FIG. 6, the composition unit 33 generates a composite image by combining respective images of rectangular regions cut out from the virtual viewpoint images. The rectangular regions are equal in size, and each include the corresponding 3D object 101. Specifically, the composition unit 33 generates a composite image 121-2 in which images 122*a*-2 to 122*e*-2 are arranged side by side.

Note that the image 122*a*-2 is an image of a rectangular region including the 3D object 101*a*, cut out from a virtual viewpoint image generated on the basis of the virtual camera 102*a*. The image 122*b*-2 is an image of a rectangular region including the 3D object 101*b*, cut out from a virtual viewpoint image generated on the basis of the virtual camera 102*b*. The image 122*c*-2 is an image of a rectangular region including the 3D object 101*c*, cut out from a virtual viewpoint image generated on the basis of the virtual camera 102*c*. The image 122*d*-2 is an image of a rectangular region including the 3D object 101*d*, cut out from a virtual viewpoint image generated on the basis of the virtual camera 102*d*. The image 122*e*-2 is an image of a rectangular region including the 3D object 101*e*, cut out from a virtual viewpoint image generated on the basis of the virtual camera 102*e*.

Then, the moving image generation unit 34 generates a frame based on the composite image 121-2, and adds the frame to the moving image.

Figure 7:
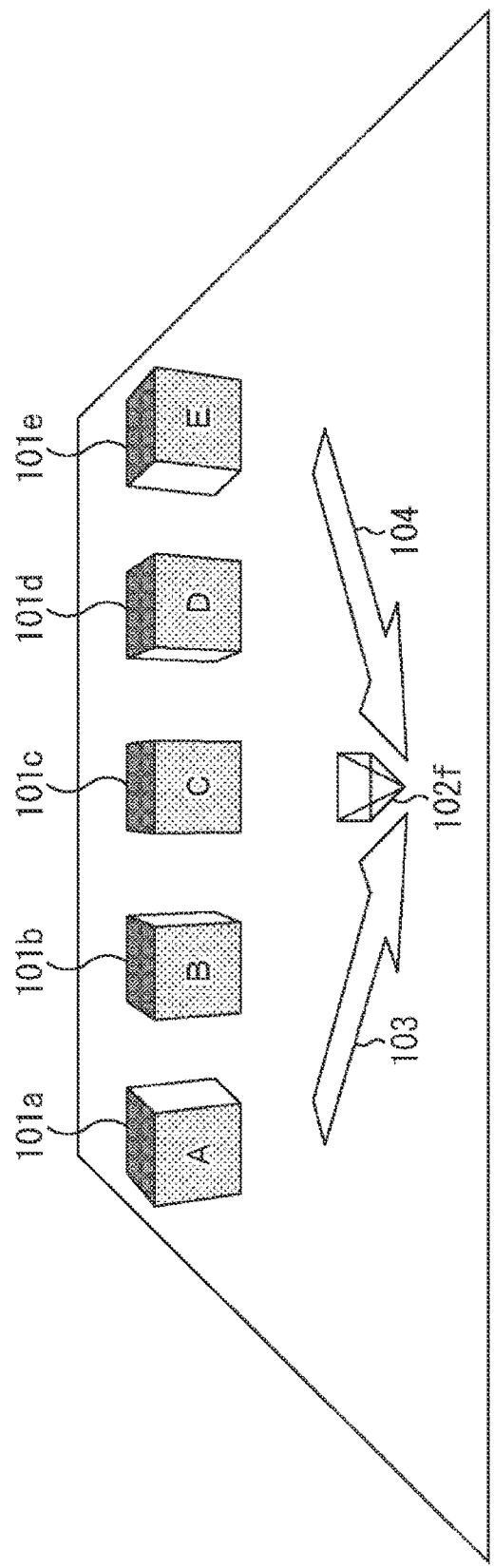
FIG. 7 is a diagram for describing the first specific example of the moving image generation method.

Thereafter, as shown in FIG. 7, the virtual camera setting unit 31 finally integrates each virtual camera 102 into a virtual camera 102*f*.

Note that the number of frames of the moving image to be generated before each virtual camera 102 is integrated into the virtual camera 102*f* can be freely set. That is, at any desired point on a trajectory on which each virtual camera 102 moves, it is possible to generate a virtual viewpoint image based on each virtual camera, generate a composite image based on the virtual viewpoint images, and generate a frame of the moving image based on the composite image. As a result of repetition of this process, virtual viewpoint images, a composite image, and a frame of the moving image are generated at each point on the trajectory on which each virtual camera 102 moves. That is, two or more frames of virtual viewpoint images, two or more frames of composite images, and two or more frames of the moving image are generated.

Figure 8:
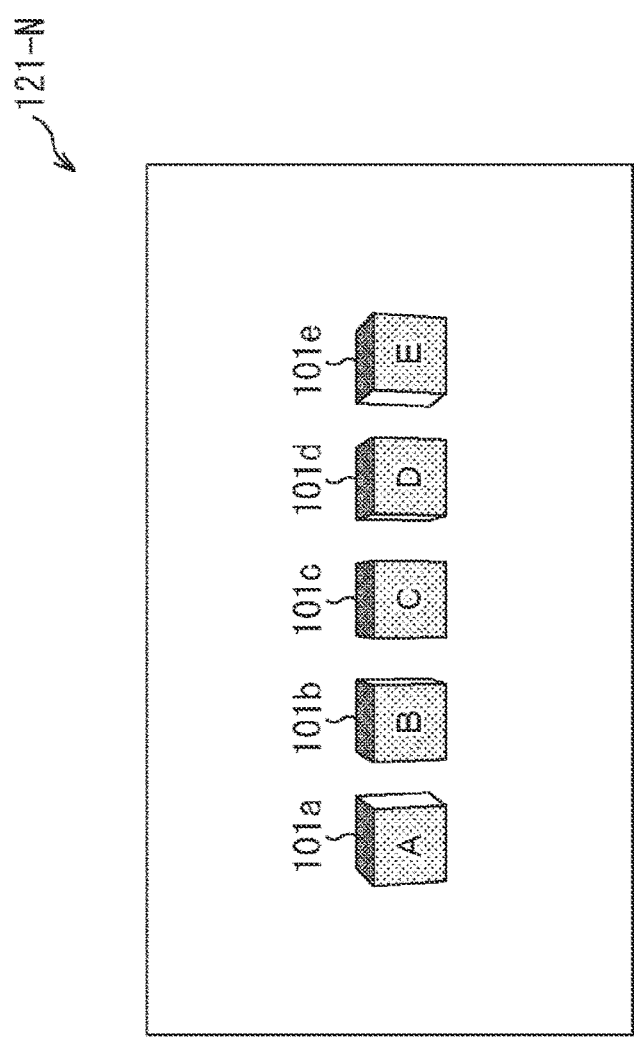
FIG. 8 is a diagram for describing the first specific example of the moving image generation method.

Then, the virtual viewpoint image generation unit 32 generates a virtual viewpoint image 121-N including the 3D objects 101*a* to 101*e* shown in FIG. 8 on the basis of the virtual camera 102*f*.

Furthermore, the moving image generation unit 34 generates a frame based on the virtual viewpoint image 121-N, and adds the frame to the moving image. As a result, the frames based on the composite images based on the plurality of virtual viewpoint images corresponding to the respective virtual cameras yet to be integrated and the frame based on the virtual viewpoint image corresponding to the integrated virtual camera are obtained as successive frames.

Note that each 3D object 101 may move or stand still while each virtual camera 102 moving.

As described above, different virtual cameras are arranged for the respective 3D objects 101, and there are generated frames of the moving image based on composite images based on a plurality of virtual viewpoint images corresponding to each virtual camera while each virtual camera is moving in a proper direction in such a way as to be integrated into a single virtual camera. There is generated a frame of the moving image based on a virtual viewpoint image corresponding to the virtual camera into which each virtual camera has been integrated.

As a result, for example, it is possible to produce a visual effect such that the user who views the moving image feels as if a plurality of objects (for example, persons) separately existing in different spaces naturally moved to a single space.

Note that the number of the 3D objects 101 can be freely set. For example, the number of the 3D objects 101 may be set to 1.

In a case where the number of 3D objects is set to 1, for example, a plurality of the virtual cameras 102 having different virtual viewpoints is arranged for the single 3D object 101. Then, each virtual camera 102 moves in such a way as to be finally integrated into a single virtual camera. In this case, the same 3D object is included in each virtual viewpoint image.

Furthermore, the number of the virtual cameras 102 can also be set to any number equal to or greater than 2. Furthermore, the 3D objects 101 and the virtual cameras 102 need not be equal in number.

In a case where the number of the virtual cameras 102 is less than the number of the 3D objects 101, for example, one or more virtual cameras 102 are arranged in such a way as to include a plurality of the 3D objects 101 within the angle of view.

Furthermore, for example, each virtual camera 102 may be placed is such a way as to include all the 3D objects 101 within the angle of view and then moved in such a way as to be integrated into a single virtual camera. In this case, each virtual viewpoint image includes a plurality of the same 3D objects.

Moreover, not all the virtual cameras 102 need to move. For example, the virtual cameras 102 may be configured such that while a single virtual camera 102 is fixed, the other virtual cameras 102 move toward the fixed virtual camera 102 to be integrated.

In addition, not all the virtual cameras 102 need to be integrated. Therefore, the virtual cameras 102 may be configured such that only some of the virtual cameras 102 are integrated.

Moreover, not all the virtual cameras 102 need to be integrated at the same time, and for example, the virtual cameras 102 may be integrated in sequence.

Furthermore, for example, each virtual camera 102 may be integrated into the virtual camera 102f and then separated again.

Figure 9:
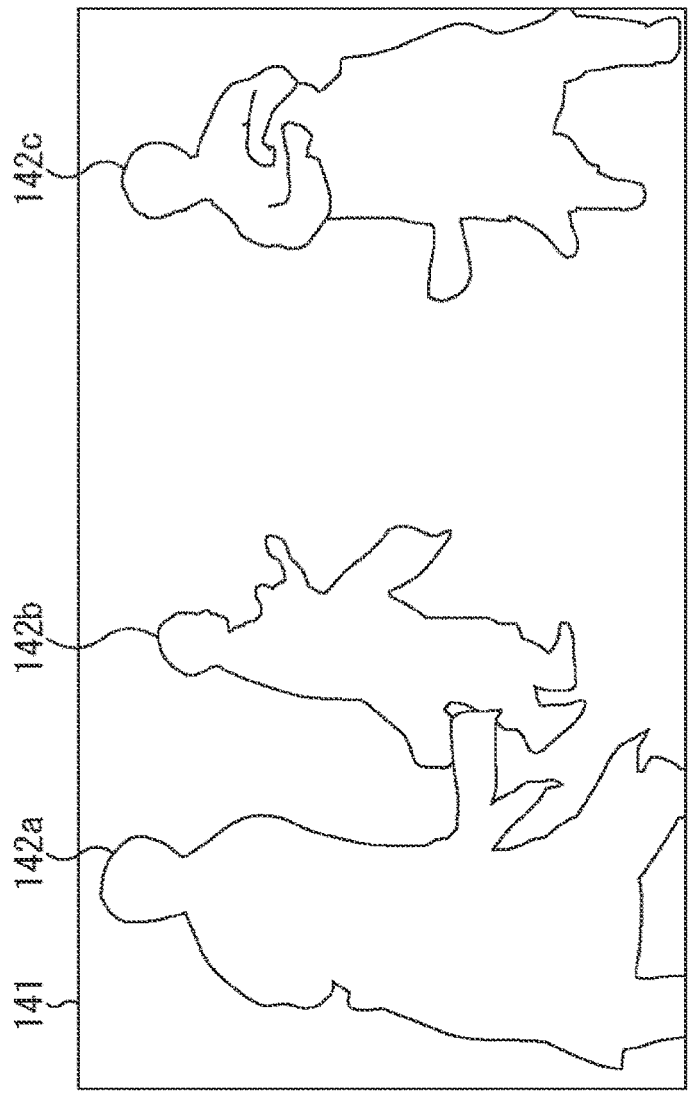
FIG. 9 is a diagram for describing a second specific example of the moving image generation method.

Next, a second specific example of the moving image generation method will be described with reference to FIG. 9.

In this example, for example, the virtual camera setting unit 31 arranges three virtual cameras (not shown) such that a 3D object 142 located in the center is surrounded by the three virtual cameras. For example, the three virtual cameras are arranged at equal angular intervals (that is, at intervals of 120 degrees) around the 3D object 142 located in the center.

The virtual viewpoint image generation unit 32 generates three virtual viewpoint images including the same 3D object on the basis of the respective virtual cameras. The virtual viewpoint images show the 3D object viewed from respective virtual viewpoints that are 120 degrees apart.

The composition unit 33 generates a composite image by cutting out an image of the 3D object from each virtual viewpoint image and combining the images to form a single image. For example, as shown in FIG. 9, the composition unit 33 combines, in a composite image 141, (images of) 3D objects 142a to 142c extracted from the respective virtual viewpoint images.

At this time, the composition unit 33 arranges the 3D objects 142a to 142c at regular intervals (that is, at intervals of 120 degrees) around a predetermined axis extending vertically in the composite image 141.

The moving image generation unit 34 generates a frame based on the composite image 141, and adds the frame to a moving image.

Thereafter, the above-described process is repeatedly performed.

At this time, for example, the virtual camera setting unit 31 fixes the position and orientation of each virtual camera.

Furthermore, for example, the composition unit 33 combines the 3D objects 142a to 142c in the composite image such that as a transition is made from one frame to another, the 3D objects 142a to 142c are rotated around the above-described axis, with the 120-degree intervals kept constant.

As a result, there is produced an effect of making the 3D objects 142a to 142a, which represent the same 3D object 142 viewed from different virtual viewpoints, seem to rotate around the predetermined axis in the moving image like a kaleidoscope.

Note that the number of the virtual cameras can be set to any number equal to or greater than 2.

Furthermore, the virtual cameras may be arranged in any desired manner. For example, it is not always necessary to arrange the virtual cameras at regular intervals around the 3D object.

Moreover, the virtual cameras may be moved. For example, the plurality of virtual cameras may be rotated around the 3D object located in the center.

Figure 10:
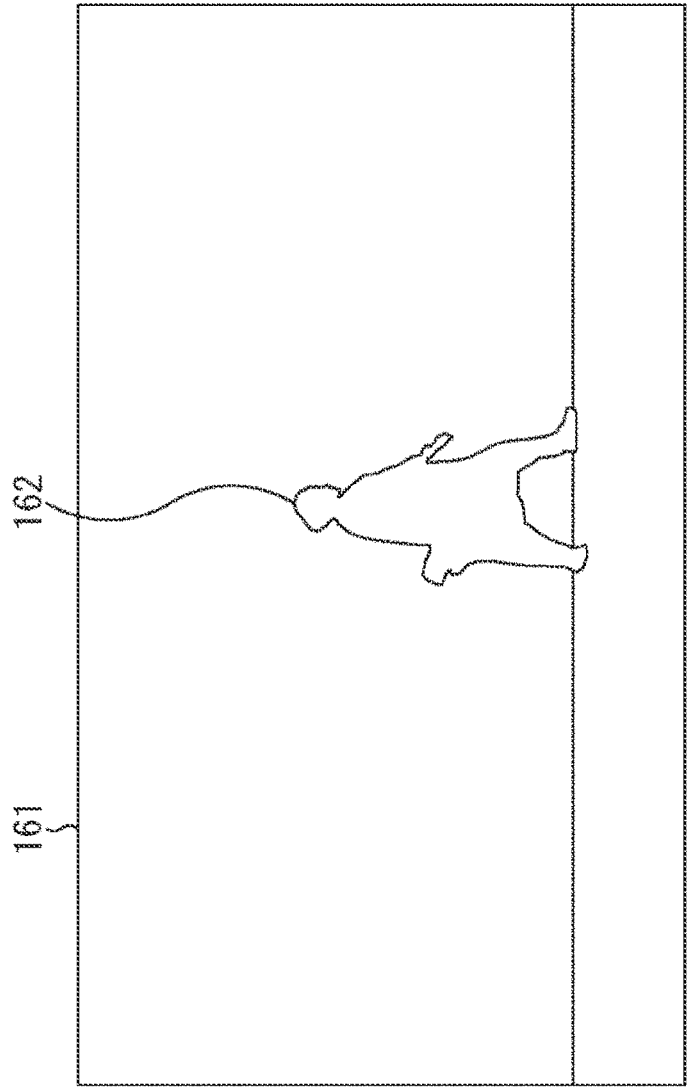
FIG. 10 is a diagram for describing a third specific example of the moving image generation method.

Next, a third specific example of the moving image generation method will be described with reference to FIG. 10.

In this example, for example, the virtual camera setting unit 31 arranges different virtual cameras for a plurality of 3D objects such that the positional relationship between the virtual cameras is similar to the positional relationship between the plurality of 3D objects. That is, the virtual camera setting unit 31 arranges the virtual cameras in similar positions and orientations with respect to the respective 3D objects.

The virtual viewpoint image generation unit 32 repeats a process of generating a plurality of virtual viewpoint images individually including the corresponding 3D objects on the basis of the respective virtual cameras at the same timing.

The moving image generation unit 34 repeats a process of selecting one of the virtual viewpoint images including the different 3D objects, generating a frame based on the selected virtual viewpoint image, and adding the frame to a moving image. At this time, for example, the moving image generation unit 34 generates two or more successive frames based on virtual viewpoint images including a certain 3D object, and then generates two or more successive frames based on virtual viewpoint images including another 3D object.

Here, as described above, the virtual cameras are arranged in similar positions and orientations with respect to the respective 3D objects. Therefore, the switching of virtual viewpoint images to be used for generating the moving image produces an effect of making a 3D object seem to be instantaneously replaced with another 3D object in the moving image. For example, a person 162 as a 3D object in a frame 161 of FIG. 10 seems to be instantaneously replaced with a different person in the next frame.

Next, a fourth specific example of the moving image generation method will be described.

For example, in a case where two or more persons are arranged as 3D objects in a 3D space, the virtual camera setting unit 31 arranges virtual cameras such that virtual viewpoints coincide with the respective viewpoints of the persons.

The virtual viewpoint image generation unit 32 repeats a process of generating a plurality of virtual viewpoint images viewed from the respective viewpoints of the persons at the same timing on the basis of the respective virtual cameras.

The moving image generation unit 34 repeats a process of selecting one of the virtual viewpoint images based on the plurality of virtual viewpoints, generating a frame based on the selected virtual viewpoint image, and adding the frame to a moving image. At this time, for example, the moving image generation unit 34 generates two or more successive frames based on virtual viewpoint images viewed from a certain person's viewpoint, and then generates two or more successive frames based on virtual viewpoint images viewed from another person's viewpoint.

As a result, an image of a person viewed from another person's viewpoint existing in the 3D space is reproduced. In addition, viewpoints to be used for reproducing images can be instantaneously switched.

As described above, it is possible to expand the range of expression in a moving image Generated by use of a 3D model.

2. Modifications

Hereinafter, modifications of the above-described embodiment of the present technology will be described.

The number, arrangement, movement, and the like of the virtual cameras described above are examples, and can be freely changed.

Furthermore, the number, type, arrangement, movement, and the like of the 3D objects described above are also examples, and can be freely changed.

3. Others

Configuration Example of Computer

A series of the processes described above can be implemented by hardware, or can be implemented by software. In a case where the series of processes is implemented by software, a program included in the software is installed in a computer. Here, examples of the computes include a computes incorporated in dedicated hardware and a general-purpose personal computer or the like capable of performing various functions by installing various programs.

Figure 11:
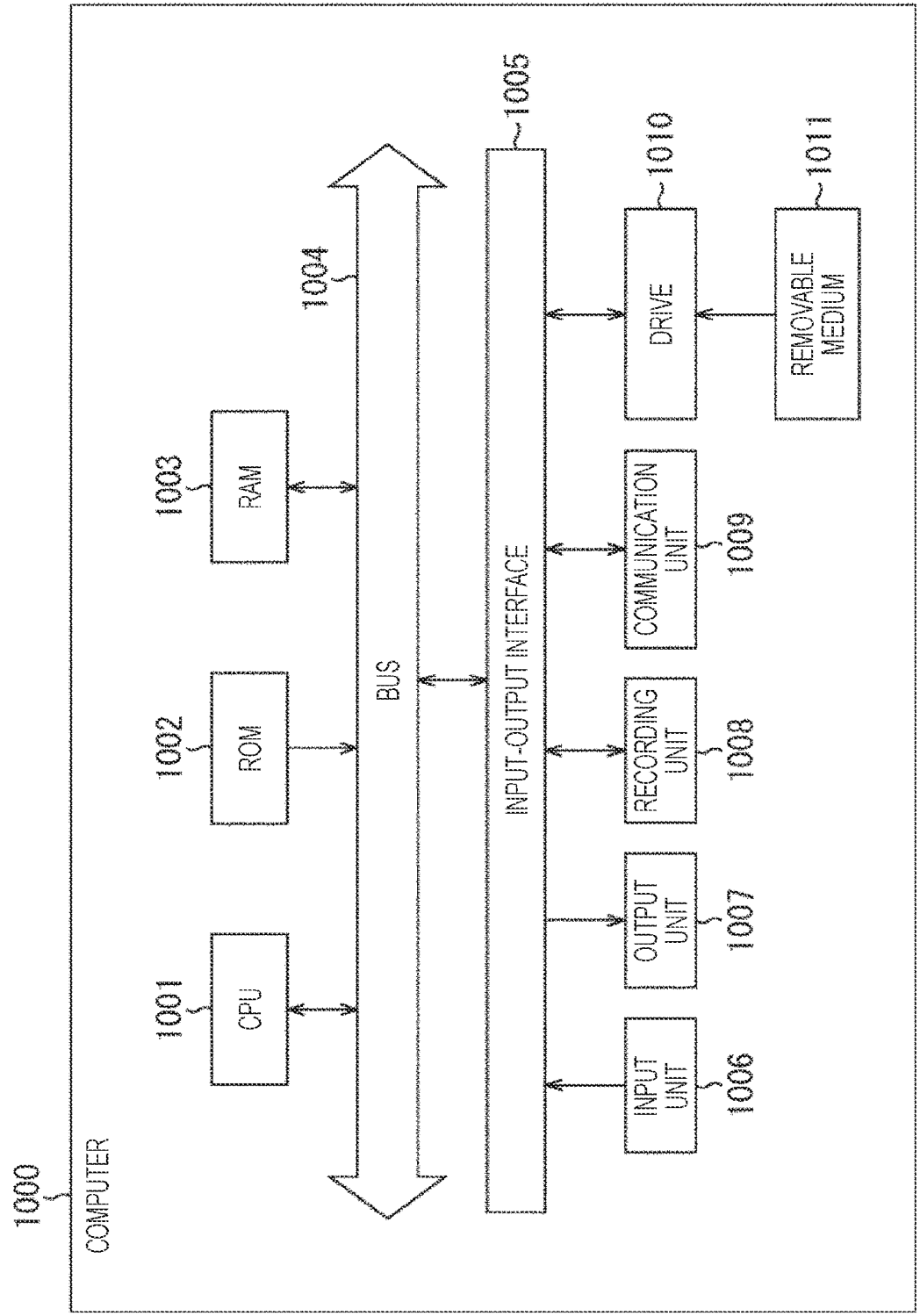
FIG. 11 is a diagram showing a configuration example of a computer.

FIG. 11 is a block diagram showing a configuration example of hardware of a computer that performs the series of processes described above by means of a program.

In a computer 1000, a central processing unit (CPU) 1001, a read only memory (ROM) 1002, and a random access memory (RAM) 1003 are interconnected via a bus 1004.

The bus 1004 is further connected to an input-output interface 1005. The input-output interface 1005 is connected to an input unit 1006, an output unit 1007, a recording unit 1008, a communication unit 1009, and a drive 1010.

The input unit 1006 includes an input switch, a button, a microphone, an image pickup device, and the like. The output unit 1007 includes a display, a speaker, and the like. The recording unit 1008 includes a hard disk, a nonvolatile memory, or the like. The communication unit 1009 includes a network interface and the like. The drive 1010 drives a removable medium 1011 such as a magnetic disk, an optical disk, a magneto optical disk, or a semiconductor memory.

In the computer 1000 configured as described above, the CPU 1001 loads a program recorded in, for example, the recording unit 1008 into the RAM 1003 via the input-output interface 1005 and the bus 1004, and executes the program, so that the series of processes described above is performed.

A program to be executed by the computer 1000 (CPU 1001) can be provided after being recorded on, for example, the removable medium 1011 as a package medium or the like. Furthermore, the program can be provided via a wired or wireless transmission medium such as a local area network, the Internet, or digital satellite broadcasting.

In the computer 1000, it is possible to install the program in the recording unit 1008 via the input-output interface 1005 by mounting the removable medium 1011 on the drive 1010. Furthermore, the program can be received by the communication unit 1009 via a wired or wireless transmission medium, and installed in the recording unit 1008. In addition, the program can be installed in the ROM 1002 or the recording unit 1008 in advance.

Note that the program to be executed by the computer may be a program that causes processes to be performed on a time-series basis in accordance with the order described in the present specification. Alternatively, the program may be a program that causes processes to be performed in parallel or at necessary timing such as timing when a call made.

Moreover, in the present specification, the term "system" refers to a set of multiple constituent elements (devices, modules (parts), and the like), and it does not matter whether or not all the constituent elements are in the same housing. Therefore, a plurality of devices stored in separate housings and connected via a network, and a single device including a plurality of modules stored in a single housing are both considered systems.

Moreover, embodiments of the present technology are not limited to the above-described embodiment, and various modifications can be made without departing from the scope of the present technology.

For example, in the present technology, it is possible to adopt a configuration of cloud computing in which a plurality of devices shares a single function and performs processing in collaboration with each other via a network.

Furthermore, each step described in the above-described flowchart can be performed by a single device, or can be performed by a plurality of devices sharing duties.

Moreover, in a case where a plurality of processes is included in a single step, the plurality of processes included in the single step can be performed by a single device, or can be performed by a plurality of devices sharing duties.

Combination Examples of Configuration

The present technology can also adopt the following configurations.

(1)

An image processing apparatus including:
a virtual camera setting unit that makes settings for a virtual camera;
a virtual viewpoint image generation unit that generates a virtual viewpoint image that is an image of a 3D object viewed from a viewpoint of the virtual camera;
a composition unit that generates a composite image based on a plurality of the virtual viewpoint images; and
a moving image generation unit that generates a moving image including a frame based on the virtual viewpoint image or the composite image,
in which after arranging a plurality of the virtual cameras, the virtual camera setting unit moves at least one of the plurality of virtual cameras to integrate the plurality of virtual cameras.

(2)

The image processing apparatus according to (1) above, in which
the virtual viewpoint image generation unit generates a plurality of pre-integration virtual viewpoint images and a post-integration virtual viewpoint image, the pre-integration virtual viewpoint images being the virtual viewpoint images based on the respective virtual cameras yet to be integrated, the post-integration virtual viewpoint image being the virtual viewpoint image based on the integrated virtual camera,
the composition unit generates a pre-integration composite image that is the composite image based on the plurality of pre-integration virtual viewpoint images, and
the moving image generation unit generates a moving image including a pre-integration frame and a post-integration frame, the pre-integration frame being a frame based on the pre-integration composite image, the post-integration frame being a frame based on the post-integration virtual viewpoint image.

(3)

The image processing apparatus according to (2) above, in which
the virtual viewpoint image generation unit generates two or more frames of the plurality of pre-integration virtual viewpoint images based on the respective virtual cameras before the respective virtual cameras are integrated, the composition unit generates two or more frames of the pre-integration composite images on the basis of the plurality of pre-integration virtual viewpoint images of each frame, and the moving image generation unit generates a plurality of the pre-integration frames on the basis of the pre-integration composite image of each frame.

(4)

The image processing apparatus according to (2) or (3) above, in which the moving image generation unit generates a moving image including the pre-integration frame and the post-integration frame as successive frames.

(5)

The image processing apparatus according to any one of (2) to (4) above, in which the pre-integration virtual viewpoint images include respective different 3D objects, and the post-integration virtual viewpoint image includes all the different 3D objects.

(6)

The image processing apparatus according to (5) above, in which the composition unit generates the composite image by combining images of the respective 3D objects in the pre-integration virtual viewpoint images.

(7)

The image processing apparatus according to any one of (2) to (4) above, in which each of the pre-integration virtual viewpoint images and the post-integration virtual viewpoint image include the same 3D object.

(8)

The image processing apparatus according to (7) above, in which each of the pre-integration virtual viewpoint images and the post-integration virtual viewpoint image include a plurality of the same 3D objects.

(9)

The image processing apparatus according to any one of (1) to (8) above, in which the virtual camera setting unit arranges a plurality of the virtual cameras such that a 3D object is surrounded by the plurality of virtual cameras, the virtual viewpoint image generation unit generates a plurality of the virtual viewpoint images based on the respective virtual cameras, the composition unit generates the composite image in which images of the 3D object in the respective virtual viewpoint images are arranged around a predetermined axis, and rotates the images of the 3D object around the axis as a transition is made from one frame to another, and the moving image generation unit generates a moving image including a plurality of frames based on the composite image of each frame.

(10)

The image processing apparatus according to (9) above, in which the virtual camera setting unit arranges the virtual cameras at equal angular intervals around the 3D object located in a center.

(11)

The image processing apparatus according to any one of (1) to (10) above, in which the virtual camera setting unit arranges the respective different virtual cameras for a plurality of 3D objects such that a positional relationship between the virtual cameras is similar to a positional relationship between the plurality of 3D objects, the virtual viewpoint image generation unit generates a plurality of the virtual viewpoint images including the 3D objects on the basis of the respective virtual cameras, and the moving image generation unit generates a frame based on the virtual viewpoint image selected from among the plurality of virtual viewpoint images, and switches the virtual viewpoint images to be used for generating frames partway through the moving image.

(12)

The image processing apparatus according to any one of (1) to (11) above, in which the virtual camera setting unit sets a position and an orientation of the virtual camera in a 3D space in which the 3D object is placed.

(13)

The image processing apparatus according to (12) above, in which the virtual camera setting unit further sets a focal length of the virtual camera.

(14)

An image processing method including:

causing an image processing apparatus to move at least one of a plurality of virtual cameras to integrate the plurality of virtual cameras after arranging the of virtual cameras, the image processing apparatus being configured to make settings for the virtual camera; generate a virtual viewpoint image that is an image of a 3D object viewed from a viewpoint of the virtual camera; generate a composite image based on a plurality of the virtual viewpoint images; and generate a moving image including a frame based on the virtual viewpoint image or the composite image.

(15)

A program for causing a computer of an image processing apparatus to perform a process of moving at least one of a plurality of virtual cameras to integrate the plurality of virtual cameras after arranging the plurality of virtual cameras, the image processing apparatus being configured to make settings for the virtual camera; generate a virtual viewpoint image that is an image of a 3D object viewed from a viewpoint of the virtual camera; generate a composite image based on a plurality of the virtual viewpoint images; and generate a moving image including a frame based on the virtual viewpoint image or the composite image.

Note that the effects described in the present specification are merely illustrative and not restrictive, and other effects may be achieved.

REFERENCE SIGNS LIST

11 Image processing apparatus
12 Image processing unit
31 Virtual camera setting unit
32 Virtual viewpoint image generation unit
33 Composition unit
34 Moving image generation unit

The invention claimed is:

1. An image processing apparatus comprising:
a virtual camera setting unit configured to make settings for each virtual camera of a plurality of virtual cameras;

a virtual viewpoint image generation unit configured to generate a plurality of virtual viewpoint images including a virtual viewpoint image that is an image of a 3D object viewed from a viewpoint of each virtual camera;

a composition unit configured to generate a composite image based on the plurality of the virtual viewpoint images; and a moving image generation unit configured to generate a moving image including a frame based on at least one virtual viewpoint image or the composite image, wherein after arranging the plurality of the virtual cameras, the virtual camera setting unit is further configured to move at least one of the plurality of virtual cameras to integrate the plurality of virtual cameras into a single virtual camera, and wherein the virtual camera setting unit, the virtual viewpoint image generation unit, the composition unit, and the moving image generation unit are each implemented via at least one processor.

2. The image processing apparatus according to claim 1, wherein the virtual viewpoint image generation unit generates a plurality of pre-integration virtual viewpoint images and a post-integration virtual viewpoint image, the pre-integration virtual viewpoint images being the virtual viewpoint images based on the respective virtual cameras yet to be integrated, the post-integration virtual viewpoint image being the virtual viewpoint image based on the integrated virtual camera, the composition unit generates a pre-integration composite image that is the composite image based on the plurality of pre-integration virtual viewpoint images, and the moving image generation unit generates a moving image including a pre-integration frame and a post-integration frame, the pre-integration frame being a frame based on the pre-integration composite image, the post-integration frame being a frame based on the post-integration virtual viewpoint image.

3. The image processing apparatus according to claim 2, wherein the virtual viewpoint image generation unit generates two or more frames of the plurality of pre-integration virtual viewpoint images based on the respective virtual cameras before the respective virtual cameras are integrated, the composition unit generates two or more frames of the pre-integration composite images on a basis of the plurality of pre-integration virtual viewpoint images of each frame, and the moving image generation unit generates a plurality of the pre-integration frames on a basis of the pre-integration composite image of each frame.

4. The image processing apparatus according to claim 2, wherein the moving image generation unit generates a moving image including the pre-integration frame and the post-integration frame as successive frames.

5. The image processing apparatus according to claim 2, wherein the pre-integration virtual viewpoint images include respective different 3D objects, and the post-integration virtual viewpoint image includes all the different 3D objects.

6. The image processing apparatus according to claim 5, wherein the composition unit generates the composite image by combining images of the respective 3D objects in the pre-integration virtual viewpoint images.

7. The image processing apparatus according to claim 2, wherein each of the pre-integration virtual viewpoint images and the post-integration virtual viewpoint image include a same 3D object.

8. The image processing apparatus according to claim 7, wherein each of the pre-integration virtual viewpoint images and the post-integration virtual viewpoint image include a plurality of same 3D objects.

9. The image processing apparatus according to claim 1, wherein the virtual camera setting unit arranges the plurality of the virtual cameras such that a 3D object is surrounded by the plurality of virtual cameras, the virtual viewpoint image generation unit generates a plurality of the virtual viewpoint images based on the respective virtual cameras, the composition unit
generates the composite image in which images of the 3D object in the respective virtual viewpoint images are arranged around a predetermined axis, and
rotates the images of the 3D object around the axis as a transition is made from one frame to another, and the moving image generation unit generates a moving image including a plurality of frames based on the composite image of each frame.

10. The image processing apparatus according to claim 9, wherein the virtual camera setting unit arranges the virtual cameras at equal angular intervals around the 3D object located in a center.

11. The image processing apparatus according to claim 1, wherein the virtual camera setting unit arranges the respective different virtual cameras for a plurality of 3D objects such that a positional relationship between the virtual cameras is similar to a positional relationship between the plurality of 3D objects, the virtual viewpoint image generation unit generates a plurality of the virtual viewpoint images including the 3D objects on a basis of the respective virtual cameras, and the moving image generation unit generates a frame based on the virtual viewpoint image selected from among the plurality of virtual viewpoint images, and switches the virtual viewpoint images to be used for generating frames partway through the moving image.

12. The image processing apparatus according to claim 1, wherein the virtual camera setting unit sets a position and an orientation of each virtual camera in a 3D space in which the 3D object is placed.

13. The image processing apparatus according to claim 12, wherein the virtual camera setting unit further sets a focal length of each virtual camera.

14. An image processing method, executed by an image processing apparatus implemented via at least one processor, the method comprising:

making settings for each virtual camera of a plurality of virtual cameras;

generating a plurality of virtual viewpoint images including a virtual viewpoint image that is an image of a 3D object viewed from a viewpoint of each virtual camera;

generating a composite image based on the plurality of the virtual viewpoint images;

generating a moving image including a frame based on at least one virtual viewpoint image or the composite image; and causing an image processing apparatus to move at least one of a plurality of virtual cameras to integrate the plurality of virtual cameras into a single virtual camera after arranging the plurality of virtual cameras.

15. A non-transitory computer-readable storage medium having embodied thereon a program, which when executed by a computer of an image processing apparatus causes the computer to perform a method, the method comprising:

making settings for each virtual camera of a plurality of virtual cameras;

generating a plurality of virtual viewpoint images including a virtual viewpoint image that is an image of a 3D object viewed from a viewpoint of each virtual camera;

generating a composite image based on the plurality of the virtual viewpoint images;

generating a moving image including a frame based on at least one virtual viewpoint image or the composite image; and moving at least one of the plurality of virtual cameras to integrate the plurality of virtual cameras into a single virtual camera after arranging the plurality of virtual cameras.

* * * * *